United States Patent
Lanter et al.

(10) Patent No.: US 6,716,470 B2
(45) Date of Patent: Apr. 6, 2004

(54) METHOD AND APPARATUS FOR MAKING AN ANIMAL FEED GEL USING A COOLED PIPE

(75) Inventors: Kent J. Lanter, Waterloo, IL (US); Brian K. Sorenson, Fisher, MN (US)

(73) Assignee: Purina Mills, Inc., St. Louis, MO (US)

( * ) Notice: Subject to any disclaimer, the term of this patent is extended or adjusted under 35 U.S.C. 154(b) by 284 days.

(21) Appl. No.: 09/929,639

(22) Filed: Aug. 14, 2001

(65) Prior Publication Data

US 2002/0039616 A1 Apr. 4, 2002

Related U.S. Application Data

(60) Provisional application No. 60/225,948, filed on Aug. 17, 2000.

(51) Int. Cl.[7] ............................................. A23L 1/0562
(52) U.S. Cl. .................... 426/573; 426/576; 426/635; 426/513; 426/516; 426/517; 426/805
(58) Field of Search ................. 426/576, 635, 426/513, 516, 517, 805, 573

(56) References Cited

U.S. PATENT DOCUMENTS

| | | | |
|---|---|---|---|
| 3,674,407 A | 7/1972 | Newhaus | 425/378 |
| 3,689,189 A | * 9/1972 | Wagner et al. | 425/376.1 |
| 3,743,252 A | 7/1973 | Schott, Jr. | 259/191 |
| 4,560,334 A | 12/1985 | Rutledge | 425/4 |
| 4,567,055 A | * 1/1986 | Moore | 426/578 |
| 4,643,660 A | 2/1987 | Capelle | 425/190 |
| 4,886,440 A | 12/1989 | Forrest et al. | 425/208 |
| 5,578,337 A | * 11/1996 | Thota et al. | 426/573 |
| 5,637,333 A | * 6/1997 | Lawrence et al. | 426/2 |
| 5,665,419 A | 9/1997 | Teraguchi et al. | 426/656 |
| 5,939,124 A | 8/1999 | Wenger | 426/516 |
| 5,948,459 A | 9/1999 | Telford | 426/512 |
| 6,171,632 B1 | 1/2001 | Lanter et al. | 426/573 |
| 6,303,175 B1 | * 10/2001 | Kurzinger et al. | 426/573 |

FOREIGN PATENT DOCUMENTS

| | | | |
|---|---|---|---|
| EP | 0 398 315 | * 11/1990 | |
| LU | 87750 | 6/1990 | |
| WO | 98/47392 | 10/1998 | A23L/1/0532 |

* cited by examiner

Primary Examiner—N. Bhat
(74) Attorney, Agent, or Firm—Whyte Hirschboeck Dudek SC

(57) ABSTRACT

Firm, flexible animal feed gel are prepared by a method comprises the steps of:

A. Forming a liquid animal feed at a temperature above ambient temperature;

B. Passing the liquid animal feed through a pipe cooled to a temperature below the temperature of the liquid animal feed of step (A) such that the feed solidifies to a stiff, flexible gel while in the pipe; and C. Collecting the gel as the gel exits the pipe.

The pipe may be straight or coiled, and it may be cooled through the effect of a cooling jacket or container. The composition of the animal is feed is predominantly water containing at least one gelling agent and at least one source of protein, typically an animal-derived protein such as fish or poultry meal.

15 Claims, 1 Drawing Sheet

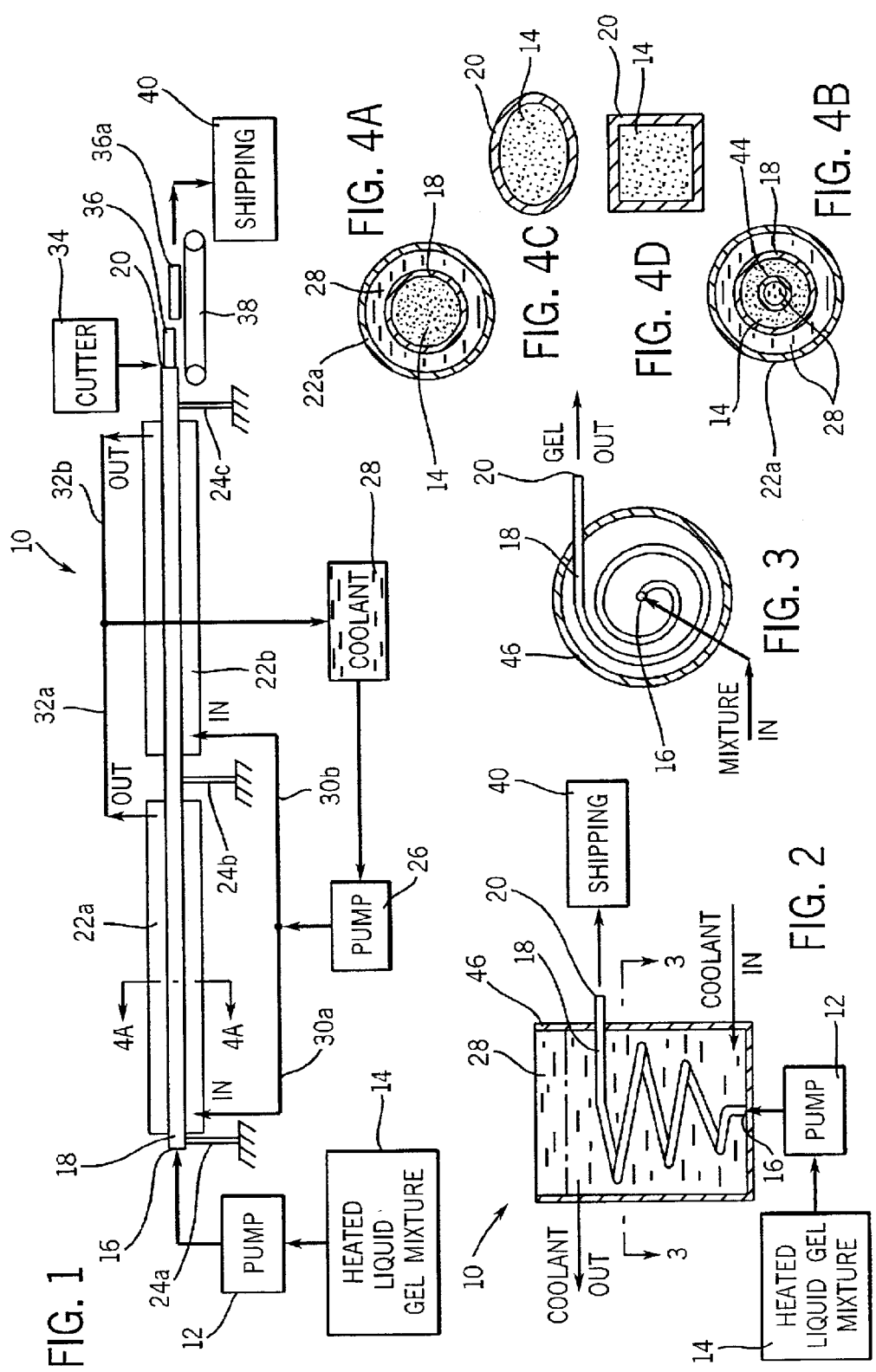

METHOD AND APPARATUS FOR MAKING AN ANIMAL FEED GEL USING A COOLED PIPE

CROSS-REFERENCE TO RELATED APPLICATION

This application claims the benefit of U.S. Provisional Application No. 60/225,948 filed Aug. 17, 2000.

BACKGROUND OF THE INVENTION

The present invention relates generally to extruded products. In one aspect, the invention relates to extruded gel products while in another aspect, the invention relates to an apparatus for extruding a gel product. In yet another aspect, the invention relates to a method for making a firm, flexible gel product suitable as a feed for animals, particularly carnivores. In still another aspect, the present invention relates to a method for making the gel product in the general shape of a natural prey animal of the carnivore.

Large quantities of animal feed are required by the many and varied zoological gardens of the world that are responsible for the breeding and care of a wide assortment of animals. Feeding these animals, particularly those that are carnivorous, can be a costly and labor intensive process that can provide numerous challenges. Ensuring that each animal receives a properly balanced diet in a timely and efficient manner requires careful planning, reliable food sources, trained personnel, and not infrequently, good fortune.

To diminish the problems associated with the feeding of large numbers of carnivorous animals, the operators of these gardens and similar establishments, e.g., breeding farms, entertainment facilities, etc., search continuously for manufactured sources of animal protein to replace natural sources of animal protein, e.g., meat, poultry, fish, and the like, fresh or frozen. Manufactured sources of animal protein are generally less expensive, and are available in bulk quantities. Additionally, they are generally easier to transport and store, and often are easier to tailor with respect to nutritional content than are natural sources of animal protein. Moreover, the sources of some natural animal protein, e.g., fish from the oceans, continue to dwindle. This in turn restricts the availability of such protein and raises its price.

While many animals, carnivorous and non-carnivorous alike, will consume fungible food items such as grain, various liquids, pellets or other processed food stuffs, most carnivores require at least some portion of their diet to be in the general shape and texture of their natural prey, e.g., the carcass or part of a carcass of a fish, bird, mammal, etc. With respect to fish-eating animals, the size, shape and texture of the fish is important to its acceptance as a food.

Animal feed gels are conventionally produced by pouring a mixture comprising at least one gelling agent, at least one protein source and water into a mold, allowing the mixture to set, and then removing the gel from the mold for packaging, shipping, storage and/or use. The finished gel product has sufficient structural integrity that it can be handled in a routine manner without breakage, e.g. it can be fed by hand to an animal without breaking in the hand of the feeder.

Extruded products and their methods of manufacture are known in the art, e.g., U.S. Pat. Nos. 5,948,459, 5,939,124, 5,665,419 and 4,886,440, all of which are incorporated herein by reference. Exemplary extruded products include a wide array of items, both food and nonfood. Significantly, extrusion methods of manufacture are useful in providing large quantities or numbers of product in a cost effective and automated manner. Extrusion devices for making such products are also known in the art, e.g., U.S. Pat. Nos. 4,643,660, 4,560,334, 3,743,252, and 3,674,407 (all of which are incorporated herein by reference).

SUMMARY OF THE INVENTION

According to one embodiment of this invention, a method for making a firm, flexible animal feed gel comprises the steps of:

A. Forming a liquid animal feed at a temperature above ambient temperature;

B. Passing the liquid animal feed through a pipe cooled to a temperature below the temperature of the liquid animal feed of step (A) such that the feed solidifies to a stiff, flexible gel while in the pipe; and C. Collecting the gel as the gel exits the pipe.

The composition of the animal is feed is predominantly water containing at least one gelling agent and at least one source of protein, typically an animal-derived protein such as fish or poultry meal. Other typical ingredients include a fat source, a gum, and various vitamins, minerals and other animal health promoters.

The animal feed is typically prepared in a heated vat from which it is transferred by any conventional means, e.g., a pump, to the pipe. The length and cross-section of the pipe can vary, but it is typically 10–30 feet in length with an internal diameter of at least about one inch. The shape of the cross-section of the pipe can also vary. The length of the pipe can be straight or coiled, and the pipe can be cooled by any suitable means, e.g., encased in a jacket through which a coolant is circulated.

In another embodiment of this invention, an apparatus for extruding a firm, flexible animal feed gel comprises:

A. A pipe having an inlet end and an outlet end, the inlet adapted for receiving a liquid animal feed at a temperature above ambient temperature and the outlet end adapted for extruding a firm, flexible animal feed gel;

B. A pump for passing the liquid animal feed through the pipe;

C. A means for cooling the liquid animal feed to a temperature below the temperature of the liquid animal feed of step (A) such that the feed solidifies to a stiff, flexible gel while in the pipe; and D. A means for collecting gel as it exits the pipe.

In one embodiment of the invention, the pump is in fluid communication with both the inlet of the pipe and a vat or similar container holding the heated liquid animal feed. In another embodiment, the pipe is straight and encased in a jacket through which a coolant is circulated while in still another embodiment, the pipe is coiled and fitted within a tank filled with a circulating coolant. In yet another embodiment, the collecting means comprises a rotating knife for cutting the gel into desired lengths as it exits the pipe. The outlet end of the pipe can be fitted with a die for forming the gel into a desired shape as it exits the pipe.

BRIEF DESCRIPTION OF THE DRAWINGS

FIG. 1 is a schematic side view of one embodiment of an apparatus for making an animal feed gel.

FIG. 2 is a partial schematic, partial cross-sectional side view of another embodiment of an apparatus for making animal feed gel.

FIG. 3 is a top, partial cross-sectional view taken along line 3—3 of FIG. 2.

FIG. 4A is a cross-sectional view taken along line 4A—4A of FIG. 1.

FIGS. 4B–D are cross-sectional views taken along line 4A—4A of FIG. 1 of alternative embodiments of the apparatus depicted in FIG. 1.

DETAILED DESCRIPTION OF THE PREFERRED EMBODIMENTS

The animal feed gel of this invention is a replacement for a natural food product. For example, the "artificial fish" of this invention is a replacement for the fresh or frozen fish currently used in feeding programs for various fish-eating animals, e.g. penguins and other seabirds, seals, walruses, otters, bears and the like. The gel products of this invention are prepared from water, at least one gelling agent, and at least one source of animal protein. Optionally and preferably, the animal food gels also contain other nutritionally valuable ingredients such as oils and/or fats, plant protein, vitamins, minerals, and the like. The formulations for the animal feed gels described in WO 98/47392, Luxembourg Patent No. 87750, and U.S. Pat. No. 6,171,632, are illustrative.

Any edible material (i.e. any material that can be consumed by the target animal without detriment to its health) that will assist in the formation of a colloid in which the disperse phase (e.g. the animal protein) combines with the continuous phase (e.g. water) to produce a firm, flexible product (e.g. a product with the consistency similar to that of a hot dog) can be used as the gelling agent in the practice of this invention. The typical and preferred gelling agents are gelatin and gums, and these can be used alone or in combination with one another (e.g. one gelatin, one gum, two or more gelatins, two or more gums, one or more gelatins in combination with one or more gums, etc.). In one preferred embodiment, the gelling agent comprises one gelatin in combination with one or more gums.

The typical preparation of the gel begins with the addition of the gelling agent to water, and then heating the water to a temperature and for a time sufficient to dissolve the gelling agent, e.g. to a temperature of at least about 120, preferably at least about 150 and more preferably at least about 180, F for at least about 0.5, preferably at least about 1 and more preferably at least about 3, minutes. Once the gelling agent is dissolved, then the remainder of the ingredients are added, generally as a previously prepared mix, and stirred to form a homogeneous mixture. This mixture is then transferred to the inlet of a cooled pipe for gelling, extrusion and collection in the form of a gelled product.

In the figures, like numerals are used to designate like parts throughout the same. Various items of equipment, such as fittings, fasteners, and the like, have been omitted so as to simplify the description. However, those skilled in the art will realize that such conventional equipment can be employed as desired.

Referring to FIG. 1, a schematic view of one embodiment for extruding the animal feed gel of the present invention is shown. Apparatus 10 comprises pump 12 which passes heated, liquid, homogeneous gel mixture 14 (an example of which is described above) into inlet 16 of straight pipe 18. The mixture passes through the pipe and toward an exit or outlet 20 (i.e., as shown, the mixture flows from left to right). The pipe can be made of any suitable material, for instance, steel, plastic, etc. The pump can be any one of a variety of types (e.g., hydraulic, pneumatic, etc.). One example of a pump suitable for use in the present invention is an APV-Gaulin lab homogenizer model 15M-8TA which is capable of supplying a pressure of 10,000 psi.

Pipe 18 includes a cooling means or mechanism which (as shown in FIG. 1) comprises a cooling jacket (also known as an outer tube or sleeve) having sections 22a and 22b. Alternatively, the cooling jacket could comprise a continuous sleeve or more than two sections. The cooling jacket may be made from any suitable material, such as metal or plastic. As shown in FIG. 1, the sections of the cooling jacket are separate from one another due to the positioning of centrally disposed support leg 24b, which is one of a plurality of support legs 24a–c shown. The support legs prevent sagging of the pipe (under its own weight as well as, for instance, the weight of the mixture passing through) when the pipe is elevated above ground level. The cooling jacket sections are disposed about the exterior surface of the pipe over its length. Pump 26 passes coolant 28 (stored, for example, in a holding tank) into and removes coolant from cooling jacket sections 22a and 22b via coolant supply lines 30a,b and coolant return lines 32a,b, respectively.

The coolant supply and return lines are typically connected to opposite ends of the cooling jacket (for example, supply line 30a and return line 32a on cooling jacket section 22a to create a coolant flow within the cooling jacket. In this way, the cooling jacket effects a temperature gradient (or differential) in the direction of mixture flow which in this case is from left to right.

The temperature of the gel product as it leaves outlet 20 can vary widely, but it is usually about or slightly below ambient temperature, e.g., 65–70 F (18–21 C). If the temperature of the gel product is above ambient as it leaves outlet 20, then it is sufficiently lower than the temperature of the liquid gel mixture that enters inlet 16 such that the mixture has essentially completely gelled. Gel product 36 that passes out of the outlet 20 has sufficient structural integrity such that it can be handled in a routine manner without breakage, (e.g., hand-packed for storage and eventual shipping). The rate of cooling and the amount of time necessary for the product to gel sufficiently for handling purposes is, of course, a function of many variables, e.g., the composition of the gel, the length and internal diameter of the pipe, the thickness of the pipe and nature of the material from which it is made, the coolant and the design of the cooling jacket, the size and operating speed of the pumps (both for the gel and the coolant), etc.

FIG. 1 also illustrates concurrent coolant flow. In other words (and as described above), the coolant flows in the direction of the liquid gel flow (i.e., from left to right). In another embodiment (not shown) coolant supply lines 30a–b and coolant return lines 32a–b are alternately disposed so as to create a counter coolant flow within the cooling jacket sections. For example, cooler (i.e, fresh) coolant could flow into jacket section 32b near outlet 20, and warmer coolant is then removed near centrally disposed support leg 24b. Such a counter coolant flow can be used to effect a different, and yet still desirable, cooling gradient within the pipe.

Still referring to FIG. 1, gel product 36 passes out of pipe 18 at outlet 20 to a cutter 34 (e.g., rotary blade, reciprocating wire, etc.). Using the cutter, the gel is sized into desired lengths. Transportation mechanism 38 (e.g., a roller/belt conveyor) transfers the gel products to another location for packaging, shipping and/or storage. These operations are performed either by hand or in an automated fashion (not shown). Preferably, the gel product is frozen for storage and/or shipping.

As suggested above, the length of the pipe is a factor based on many variables. In one embodiment, the straight pipe has a ⅞ inch internal diameter and a length of 23 feet. Two 10 foot cooling jacket sections surround it over its length and surface. The liquid gel mixture enters the pipe at a temperature of between 180–200 F, and it exits the pipe as a gel (having the consistency of a hotdog) at a temperature of between 65–70 F.

Referring to FIG. 4A, pipe 18, having a circular cross section, is shown filled with liquid gel mixture 14. Encasing pipe 18 is cooling jacket section 22a for containing and permitting the passage of coolant 28 along the outer surface of the pipe. Significantly, the gel product is extruded to have a shape that is imparted by the cross sectional shape of the pipe (or least the outlet of the pipe or in an alternative embodiment not shown, a die that attaches to outlet 20). Thus, in this embodiment, the gelling material exits the pipe with a circular cross section.

FIG. 4B (shown in cross-section) presents an alternative embodiment of apparatus 10. Here, pipe 18 has cross section formed from two concentric rings and includes exterior cooling jacket section 22a for circulating coolant 28 against the outer exterior surface of pipe 18 and interior pipe 44 for circulating coolant 28 against the inner exterior surface of pipe 18. As the gelling material passes through pipe 18, it is cooled simultaneously from both of its exterior surfaces, and gel product takes the shape of a cylinder with a centrally disposed hole (not shown), i.e., the shape of a doughnut.

FIG. 2 illustrates, in a partially schematic view, another embodiment of the present invention. Here, apparatus 10 includes pipe 18 that is coiled (or otherwise bent) into a spiral, and the pipe is placed within holding container 46 (e.g., a large drum or vat). Advantageously, this embodiment provides an effective means for saving space. As before (with regard to the embodiment of FIG. 1), pump 12 passes heated, liquid gel mixture 14 into inlet end 16 of pipe 18, through pipe 18 and toward outlet 20 (i.e., as shown, in an upward manner). The gel product (not shown) exits the pipe and is cut, packaged, stored and shipped as previously described.

In the embodiment of FIG. 2, cooling of the liquid mixture is effected by circulating (for example, using the pump referenced in FIG. 1 but not shown here) coolant 28 (which is chilled to a desired temperature) through the holding container. As shown, the coiled pipe is submersed within in the coolant so as to cool the liquid gel mixture as it passes (as shown, upwardly) through the pipe and solidifies into the animal feed gel.

FIG. 3 illustrates coiled pipe 18 of FIG. 2 within container 46 from a top view. As can be seen, in this embodiment the coiling of the pipe widens outwardly from inlet 16 to outlet 20. Generally, and as noted earlier, the coolant enters the container at the bottom (nearest the warmest section of the pipe, i.e., the inlet). The coolant exits the container at or near the top (nearest the coolest section of the pipe, i.e., the outlet). This temperature gradient provides, of course, an efficient and uniform cooling of the liquid gel as it passes through the pipe from inlet to outlet. In another embodiment, a counter flow embodiment (not shown), coolant enters the container at the top (nearest the coolest section of the pipe) and exits the container at the bottom (nearest the warmest section of the pipe).

FIGS. 4C–D illustrate alternative outlet cross sections. In FIG. 4C, outlet 20 is shown having an oval cross-section, and in FIG. 4D, outlet 20 has a rectangular cross section. Again, the shape of the outlet determines the shape of the gel product. Thus, in the embodiments of FIGS. 4C–D, the gel product is extruded having an oval-shape and rectangular-shape, respectively. One reason for imparting an oval shape to an animal feed gel is because such a shape is the general shape of a fish. Fish-eating animals are more inclined to accept an animal feed gel as food if they believe the gel is a natural prey animal. Of course, other cross sections are possible (e.g., pentagonal, hexagonal, triangular, etc.).

Although only a few embodiments of the present invention are described above in detail, those skilled in the art will appreciate that many additions and modifications can be made without departing from the spirit and scope of the invention. These and all other modification are included within the scope of the present invention as described in the following claims.

SPECIFIC EMBODIMENTS

Example 1

An animal feed gel of Formulation I was blended in a five gallon Groen, steam-jackeded, twin-action mixer.

| Dry Meal Formulation I | |
|---|---|
| Menhaden Fish Meal | 41.6 |
| Fish Oil | 20.8 |
| Ticagel[1] 550 | 10.0 |
| Poultry Meal | 13.3 |
| Xanthan Gum | 0.8 |
| Beet Pulp | 1.5 |
| Acid Casein | 3.0 |
| Micro-ingredients[2] | 9.0 |
| Dry meal | 100% |
| Final Product Formulation I | |
| Water | 75% |
| Dry Meal | 25% |

[1]Blend of locust bean gum and carrageenan from TIC Gums.
[2]Blend of various vitamins and minerals.

The gel was heated to 200 F and pumped, using a Myno pump and pressure relief valve into a high-pressure pump (APV-Gaulin lab homogenizer model 15 M-8TA). Molten gel was pumped into a 20-foot long section of coiled stainless steel tube (1-inch outer diameter by 0.87-inch inner diameter). The pipe was cooled in a 55-gallon drum of water and ice. The retention time in the tube of the gel was approximately 2 minutes and gel product was cut to 6-inch lengths by hand as it exited the tube. The product had a consistency similar to that of a hotdog, and its surface was uniform and smooth.

Example 2

An animal feed gel of Formulation II was blended in a five gallon Groen, steam-jackeded, twin-action mixer.

| Dry Meal Formulation II | |
|---|---|
| Menhaden Fish Meal | 70.6 |
| Fish Oil | 11.25 |
| Ticagel[1] 550 | 9.6 |
| Xanthan Gum | 0.4 |
| Beet Pulp | 1.5 |
| Acid Casein | 3.0 |
| Spirulina Algae | 0.15 |
| Yeast | 0.1 |
| Lecithin | 1.0 |
| Micro-ingredients | 2.4 |
| Dry meal | 100% |
| Final Product Formulation II | |
| Water product | 75% |
| Dry meal | 25% |

[1]Blend of locust bean gum and carrageenan from TIC Gums.
[2]Blend of various vitamins and minerals.

The product was heated to 180 F, and it was then poured into a high-pressure pump (APV-Gaulin lab homogenizer model 15M-8TA). Molten product was pumped into a 20-foot long, straight section of stainless steel tube (1-inch outer diameter by 0.87-inches inner diameter). The pipe was encased and cooled in a 3-inch outer diameter plastic pipe through which cold water was pumped in a counter-flow direction. Cold water was pumped from an ice/salt/water blend that was maintained at about 20 F. The retention time of the gel within the pipe was approximately 2 minutes, and the gel product was cut into 6-inch lengths by hand as it exited the pipe. The consistency of the gel product was similar to that of a hot dog, and it surface was uniform and smooth.

Although the invention has been described in considerable detail through the preceding examples, this detail is for the purpose of illustration, and it is not to be construed as a limitation upon the invention as described in the following claims.

What is claimed is:

1. A method for making a firm, flexible animal feed gel, the method comprising the steps of:

A. Forming a liquid animal feed comprising at least one gelling agent, at least one source of animal protein and predominately water, in a heated vat and at a temperature above ambient temperature to dissolve the gelling agent;

B. Transferring the liquid animal feed of step (A) from the vat to and through a pipe cooled to a temperature below the temperature of the liquid animal feed of step (A) such that the feed solidifies to a stiff, flexible gel while in the pipe; and C. Collecting the gel as the gel exits the pipe.

2. The method of claim 1 in which the gelling agent comprises at least one gelatin and at least one gum.

3. The method of claim 1 in which the liquid animal feed enters the pipe at a temperature of at least about 120 F.

4. The method of claim 1 in which the gel exits the pipe at about ambient temperature.

5. The method of claim 4 in which the gel is cut into pre-determined lengths as it exits the pipe.

6. The method of claim 1 in which the liquid animal feed is transferred from the vat to the pipe and passed through the pipe by the action of a pump.

7. An apparatus for making a firm, flexible animal feed gel comprising predominantly water, the apparatus comprising:

A. A pipe having an inlet end and an outlet end, the inlet adapted for receiving a liquid animal feed comprising predominantly water and at a temperature in excess of ambient temperature, and the outlet end adapted for extruding a firm, flexible animal feed gel;

B. A pump for passing the liquid animal feed through the pipe;

C. A means for cooling the liquid animal feed to a temperature below the temperature of the liquid animal feed of step (A) such that the feed solidifies to a stiff, flexible gel while in the pipe; and D. A means for collecting gel as it exits the pipe.

8. The apparatus of claim 7 in which the pipe is a straight pipe and the cooling means is a cooling jacket.

9. The apparatus of claim 7 in which the pipe is a coiled pipe and the cooling means is a holding container filled with a cooling liquid.

10. The apparatus of claim 8 in which the cooling jacket is filled with circulating water.

11. The apparatus of claim 9 in which the cooling liquid is circulating water.

12. The apparatus of claim 7 further equipped with a cutting means with which to cut the gel into pre-determined lengths as the gel exits the pipe.

13. The apparatus of claim 7 in fluid communication with a heated vat from which the pipe receives the liquid animal feed.

14. The apparatus of claim 13 further comprising a pump for transferring the liquid animal feed from the vat to the inlet end of the pipe.

15. The method of claim 6 in which the pipe is equipped with a cooling jacket, and the liquid animal feed is cooled while it passes through the pipe due to the cooling effect the jacket has on the pipe.

* * * * *